United States Patent
Lai

(10) Patent No.: US 8,056,247 B2
(45) Date of Patent: Nov. 15, 2011

(54) TILT SENSOR

(75) Inventor: Lu-Ming Lai, Taipei (TW)

(73) Assignee: Everlight Electronics Co., Ltd., New Taipei (TW)

( * ) Notice: Subject to any disclaimer, the term of this patent is extended or adjusted under 35 U.S.C. 154(b) by 0 days.

(21) Appl. No.: 12/769,657

(22) Filed: Apr. 29, 2010

(65) Prior Publication Data

US 2011/0072674 A1  Mar. 31, 2011

(30) Foreign Application Priority Data

Sep. 28, 2009  (TW) .............................. 98132756 A

(51) Int. Cl.
*G01C 9/06* (2006.01)
*G01C 9/10* (2006.01)

(52) U.S. Cl. .................................. 33/366.23; 33/366.24

(58) Field of Classification Search ............... 33/366.23, 33/366.11, 366.12, 366.24
See application file for complete search history.

(56) References Cited

U.S. PATENT DOCUMENTS

| | | | | |
|---|---|---|---|---|
| 4,972,595 A * | 11/1990 | Shimamura et al. | ........ | 33/366.23 |
| 5,373,153 A * | 12/1994 | Cumberledge et al. | ..... | 250/231.1 |
| 6,341,428 B1 * | 1/2002 | Tanazawa et al. | ......... | 33/366.24 |
| 6,392,223 B1 * | 5/2002 | Hjertman et al. | .......... | 250/231.1 |
| 7,161,138 B2 * | 1/2007 | Hsu | .............. | 250/231.1 |
| 7,353,615 B1 * | 4/2008 | Branch | ...................... | 33/366.11 |
| 2010/0101103 A1 * | 4/2010 | Horio et al. | ................. | 33/366.23 |
| 2010/0220319 A1 * | 9/2010 | Lai | .............................. | 356/139.1 |
| 2011/0041350 A1 * | 2/2011 | Makimura | .................. | 33/366.23 |
| 2011/0072673 A1 * | 3/2011 | Lai | ................................... | 33/365 |

FOREIGN PATENT DOCUMENTS

| | | |
|---|---|---|
| EP | 2213978 | 8/2010 |
| EP | 2224206 | 9/2010 |
| JP | 2006226794 | 8/2006 |
| JP | 2010103002 A * | 5/2010 |
| JP | 2010204097 A * | 9/2010 |

OTHER PUBLICATIONS

"Extended Search Report of Europe Counterpart Application", issued on Jan. 19, 2011, p. 1-p. 7, in which the listed references were cited.

* cited by examiner

*Primary Examiner* — Christopher Fulton
(74) *Attorney, Agent, or Firm* — Jianq Chyun IP Office

(57) ABSTRACT

A tilt sensor including a body, an LED, a first photosensitive device, a second photosensitive device, and a moving thin-element is provided. The body has a movement region, a first containing region, a second containing region, and a third containing region. The first, second, and third containing regions have an opening respectively and are connected with the movement region through the openings. The LED providing a light beam is disposed in the first containing region. The first and second photosensitive devices are disposed in the second and third containing regions respectively. When the body tilts toward different tilt directions, the moving thin-element moves in the tilt direction, allowing the light beam provided from the LED to reflect directly to the first and second photosensitive devices, or shielding the light beam provided from the LED from being transmitted to the first and second photosensitive devices.

14 Claims, 1 Drawing Sheet

TILT SENSOR

CROSS-REFERENCE TO RELATED APPLICATION

This application claims the priority benefit of Taiwan application serial no. 98132756, filed on Sep. 28, 2009. The entirety of the above-mentioned patent application is hereby incorporated by reference herein and made a part of specification.

BACKGROUND OF THE INVENTION

1. Field of the Invention

The invention generally relates to a sensor, and more particularly, to a tilt sensor.

2. Description of Related Art

Generally speaking, commercially available tilt sensors are usually dual-phase sensing, meaning the sensors can only sense two tilt directions. These sensors are typically quite bulky. Regarding the current consumer electronic products such as cellular phones, conventional tilt sensors may find difficulty for applications in such devices where a thin and sleek profile is usually preferable.

Furthermore, if a quad-phase sensing tilt sensor is required, the four directions being up, down, left, and right, then usually two sets complementing dual-phase sensors are needed. However, in this implementation, costs cannot be lowered, device bulk cannot be decreased, and fabrication steps cannot be reduced.

Accordingly, an important issue is to design a suitable tilt sensor which has small size and low cost, and is adaptable in consumer electronic products having a thin profile and low cost.

SUMMARY OF THE INVENTION

An aspect of the invention provides a tilt sensor for sensing a plurality of tilt directions that is thin, low cost, and easy to fabricate.

An aspect of the invention provides a tilt sensor including a body, a light emitting device (LED), a first photosensitive device, a second photosensitive device, and a moving thin-element. The body is suitable for tilting in a plurality of directions. The body includes a movement region, a first containing region, a second containing region, and a third containing region. The first containing region has a first opening, and the first containing region is connected with the movement region through the first opening. The second containing region has a second opening, and the second containing region is connected with the movement region through the second opening. The third containing region has a third opening, and the third containing region is connected with the movement region through the third opening. The LED is disposed in the first containing region, and the LED is suitable for providing a light beam. The first photosensitive device is disposed in the second containing region and arranged on a side of the LED. The second photosensitive device is disposed in the third containing region and arranged on another side of the LED. The moving thin-element is disposed in the movement region. When the body tilts toward one of the different tilt directions, the movable thin-element is correspondingly moved toward the tilt direction. Moreover, the moving thin-element directly reflects the light beam provided from the LED to at least one of the first photosensitive device and the second photosensitive device. Alternatively, the moving thin-element shields the light beam provided from the LED from being transmitted to the first photosensitive device and the second photosensitive device.

In one embodiment of the invention, a width of the first opening is larger than or equal to a size of the first containing region, a width of the second opening is larger than or equal to a size of the second containing region, and a width of the third opening is larger than or equal to a size of the third containing region.

In one embodiment of the invention, a size of the moving thin-element is larger than the width of the first opening, the width of the second opening, and the width of the third opening.

In one embodiment of the invention, a shape of the moving thin-element is a polygon.

In one embodiment of the invention, the shape of the moving thin-element is a rectangle.

In one embodiment of the invention, the moving thin-element is a light reflective thin-element suitable for reflecting the light beam of infrared wavelength.

In one embodiment of the invention, a thickness of the moving thin-element is substantially between 0.6 mm~0.1 mm.

In one embodiment of the invention, the LED is a side-emitting LED, and the light beam is an infrared light. The first photosensitive device and the second photosensitive device are respectively a photodiode or a phototransistor.

In one embodiment of the invention, the LED, the first photosensitive device, and the second photosensitive device are die-bonded on a common plate.

In one embodiment of the invention, the body includes a substrate and a housing. The housing is disposed on the substrate, and the housing has a recess structure. Along with the substrate, the recess structure of the housing defines the movement region, the first containing region, the second containing region, and the third containing region.

In one embodiment of the invention, based on how the first and second photosensitive devices receive the light beam, the tilt direction of the tilt sensor can be deduced. Moreover, since a moving thin-element less than or equal to 0.6 mm and larger than 0.1 mm thick is adopted, and the LED and the first and second photosensitive devices are die-bonded on a common plate, the thickness of the tilt sensor can be substantially reduced.

In order to make the aforementioned and other features and advantages of the invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
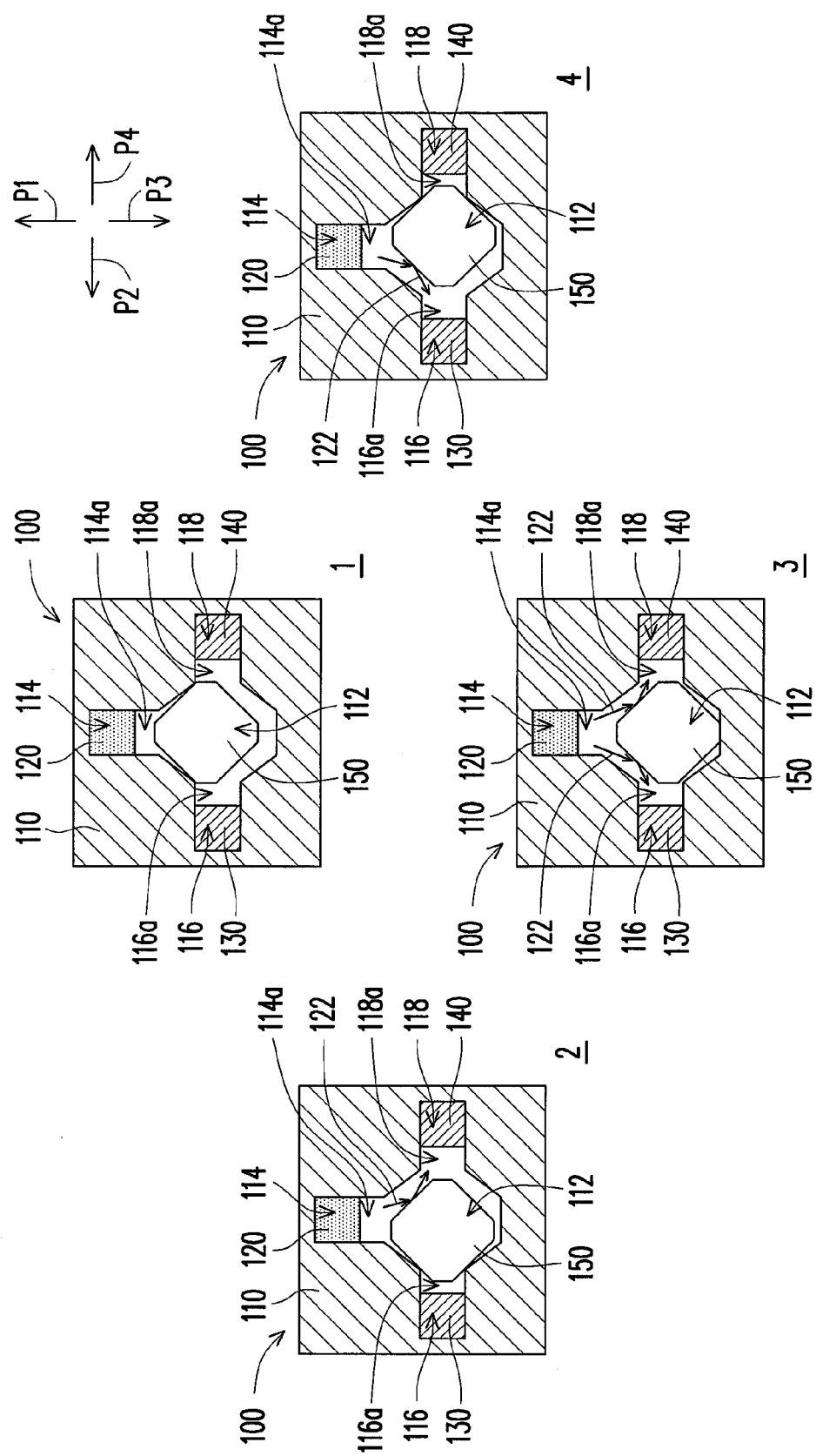
FIG. 1 is a schematic diagram illustrating a tilt sensor adapted for sensing different tilt directions in accordance with one embodiment of the invention.

FIG. 1 is a schematic view illustrating a tilt sensor configured to sense different tilt directions in accordance with an embodiment of the invention. Referring to FIG. 1, a tilt sensor 100 according to the present embodiment includes a body 110, a light emitting device (LED) 120, a first photosensitive device 130, a second photosensitive device 140, and a moving thin-element 150.

The body 110 is suitable for tilting in a plurality of directions P1, P2, P3, and P4. The body 110 includes a movement region 112, a first containing region 114, a second containing region 116, and a third containing region 118. In particular, the first containing region 114 has a first opening 114a, and the first containing region 114 is connected with the movement region 112 through the first opening 114a. The second containing region 116 has a second opening 116a, and the second containing region 116 is connected with the movement region 112 through the second opening 116a. The third containing region 118 has a third opening 118a, and the third containing region 118 is connected with the movement region 112 through the third opening 118a.

In the present embodiment of the invention, the second opening 116a of the second containing region 116 is located directly opposite the third opening 118a of the third containing region 118. A width of the first opening 114a is larger than or equal to a size of the first containing region 114. A width of the second opening 116a is larger than or equal to a size of the second containing region 114. A width of the third opening 118a is larger than or equal to a size of the third containing region 118.

In the present embodiment of the invention, the body 110 can include a substrate (not shown) and a housing (not shown). The housing is disposed on the substrate, and the housing has a recess structure (not shown). The recess structure and the substrate define the above-described movement region 112, the first containing region 114, the second containing region 116, and the third containing region 118. More specifically, the housing can be fabricated by injection molding or punching molding, and the substrate, for example, is a printed circuit board (PCB). When fabrication of the housing is complete, the substrate and the housing are attached by molding or like attachment techniques. Accordingly, the body 110 is fabricated.

Continuing reference to FIG. 1, the LED 120 is disposed in the first containing region 114, and the LED 120 is suitable for providing a light beam 122. The first photosensitive device 130 is disposed in the second containing region 116 and arranged on a side of the LED 120. The second photosensitive device 140 is disposed in the third containing region 118 and arranged on another side of the LED 120. In the present embodiment of the invention, the LED 120 is, for example, a side-emitting LED, and the light beam 122 is an infrared light. Moreover, the first photosensitive device 130 and the second photosensitive device 140 are respectively a photodiode or a phototransistor. According to the above-described structure, the first light beam 122 provided by the LED 120 located in the first containing region 114 cannot be directly transmitted to the first photosensitive device 130 located in the second containing region 116, and the second photosensitive device 140 located in the third containing region 118 by directly passing through the first opening 114a.

The moving thin-element 150 is disposed in the movement region 112. When the body 110 tilts toward one of the different tilt directions P1, P2, P3 or P4, the moving thin-element 150 is correspondingly moved toward the tilt direction, so that the first light beam 122 provided from the LED 120 is directly reflected to at least one of the first photosensitive device 130 and the second photosensitive device 140. Alternatively, the moving thin-element 150 shields the light beam 122 provided from the LED 120 from being transmitted to the first photosensitive device 130 and the second photosensitive device 140.

More specifically, FIG. 1 schematically illustrates when the tilt sensor 100 is disposed at a horizontal plate, the tilt sensor 100 tilting in different directions P1, P2, P3, and P4 causes the moving thin-element 150 to correspondingly move to the different positions. For example, when the body 110 declines toward the direction P1, the moving thin-element 150 disposed in the movement region 112 is moved toward the first LED 120 due to gravity. Accordingly, a state 1 schematically depicted in FIG. 1 is formed. At this time, the moving thin-element 150 shields the light beam 122 emitted by the LED 120, and therefore the light beam 122 cannot be transmitted to the first photosensitive device 130 and the second photosensitive device 140.

Similarly, when the body 110 declines toward the direction P2, the moving thin-element 150 disposed in the movement region 112 is moved toward the first photosensitive device 130 due to gravity. Accordingly, a state 2 schematically depicted in FIG. 1 is formed. At this time, the moving thin-element 150 shields the second opening 116a of the second containing region 116, so that the light beam 122 of the LED 120 cannot be transmitted to the first photosensitive device 130. Moreover, the light beam 122 passing through the first opening 114a is directly reflected by the moving thin-element 150 to the third opening 118a and thereby transmitted to the second photosensitive device 140. It should be noted that, since a shape of the moving thin-element 150 can be rectangular, and because the light beam 122 is reflected from one of the sides of the rectangular shape, hence according to the law of reflection in optics, the light beam 122 can be more preferably reflected to the second photosensitive device 140. In one embodiment of the invention, when the shape of the moving thin-element 150 is circular, then most of the light beam 122 or all of the light beam 122 is directly reflected to the housing of the body 110, and therefore the light beam 122 cannot be reflected to the second photosensitive device 140.

Moreover, when the body 110 declines toward the direction P3, the moving thin-element 150 disposed in the movement region 112 is moved away from LED 120. Accordingly, a state 3 schematically depicted in FIG. 1 is formed. Specifically, while in state 3, the moving thin-element 150 is moving away from the LED 120. At this time, the light beam 122 of the LED 120 is reflected by the moving thin-element 150 and concurrently transmitted to the first photosensitive device 130 and the second photosensitive device 140. Similarly, since a rectangular shape design is adopted for the moving thin-element 150, the light beam 122 is reflected from two of the sides of the rectangular shape, and therefore the light beam 122 can be more preferably directly transmitted to the first photosensitive device 130 and the second photosensitive device 140.

When the body 110 declines toward the direction P4, the moving thin-element 150 disposed in the movement region 112 is moved toward the second photosensitive device 140 due to gravity. Accordingly, a state 4 schematically depicted in FIG. 1 is formed. Specifically, while in state 4, the moving thin-element 150 moves toward the second photosensitive device 140. At this time, the moving thin-element 150 shields the third opening 118a of the third containing region 118, so that the light beam 122 of the LED 120 cannot be transmitted to the second photosensitive device 140. Moreover, the light beam 122 passing through the first opening 114a is directly reflected by the moving thin-element 150 to the second opening 116a and thereby transmitted to the first photosensitive device 130. Similarly, since the shape of the movable thin-element 150 is rectangular, and the light beam 122 is reflected from one of the sides of the rectangular shape, the light beam 122 can be more preferably reflected to the first photosensitive device 130 in light of the law of reflection in optics. If the circular shape is adopted for the moving thin-element 150, then the above-mentioned scenario is produced, therefore no further description is provided hereinafter. In light of the foregoing, based on how the first photosensitive device 130 and the second photosensitive device 140 receives the light beam 122, the tilt direction of the body 110 can be deduced by the tilt sensor 100 of the present embodiment.

In the present embodiment of the invention, a size of the aforementioned moving thin-element 150 is larger than a width of the first opening 114a, a width of the second opening 116a, and a width the third opening 118a. Moreover, the shape of the moving thin-element 150 is, for example, a polygon. The present embodiment adopts the rectangular shape for the moving thin-element 150 as an illustrative example for description. Furthermore, the moving thin-element 150 is a light reflective thin-element, for example, suitable for reflecting the above-described infrared wavelength light beam 122. In the present embodiment, a thickness of the moving thin-element 150 is substantially between 0.6 mm~0.1 mm.

Moreover, in order for the tilt sensor 100 to obtain a thickness that is substantially thin, besides using a moving thin-element 150 of the above-described proportion, in the present embodiment the LED 120, the first photosensitive device 130, and the second photosensitive device 140 are die-bonded on a common plate. Therefore, the LED 120, the first photosensitive device 130, and the second photosensitive device 140 are fabricated on the same plate, and since the side-emitting LED design is adopted for the LED 120, the thickness of the tilt sensor 100 can be reduce to 0.8 mm or smaller.

It should be noted that, the above-described tilt sensor 100 which is disposed on the same horizontal plate and tilts in the different tilt directions is an exemplary embodiment. However, the tilt sensor 100 of an embodiment consistent with the invention may be applied to sense the rotation along the horizontal axis, such as the common function of the digital camera for differentiating the vertical direction. For example, while in state 3, the tilt sensor 100 may be regarded as being disposed on a vertical plate. Accordingly, the movable thin-element 150 is moved away from an edge of the LED 120 due to gravity. In this case, the first photosensitive device 130 and the second photosensitive device 140 can both receive the light beam 122, and the direction is determined as a vertical direction. Thereafter, if the tilt sensor 100 is respectively rotated clockwise by 90, 180, and 270 degrees along the horizontal axis perpendicular to the vertical plate, the movable thin-element 150 will be sequentially moved, and the states 4, 1, and 2 are respectively formed. While in different states, the first photosensitive device 130 and the second photosensitive device 140 have different light sensing combinations, as described above. In other words, based on how the first photosensitive device 130 and the second photosensitive device 140 receives the light beam 122, the rotational state of the tilt sensor 100 can be deduced.

Accordingly, the tilt sensor embodied in the invention has at least the following advantages. First of all, by designing a suitable structure for the body, the light beam of the LED can be directly reflected by the moving thin-element to the first and second photosensitive devices. By producing different tilt directions, the first and second photosensitive devices will have different corresponding light receiving states. In other words, based on how the first and second photosensitive devices receive the light beam, the tilt direction of the tilt sensor can be deduced. Moreover, since a light reflective thin-element less than or equal to 0.6 mm and larger than 0.1 mm is adopted, and the LED and the first and second photosensitive devices are die-bonded on a common plate, the thickness of the tilt sensor can be substantially reduced.

Though the invention has been disclosed above by the embodiments, they are not intended to limit the invention. Anybody skilled in the art can make some modifications and variations without departing from the spirit and scope of the invention. Therefore, the protecting range of the invention falls in the appended claims.

What is claimed is:

1. A tilt sensor, comprising:
  a body suitable for tilting in a plurality of tilt directions, comprising:
    a movement region;
    a first containing region having a first opening, the first containing region connected with the movement region through the first opening;
    a second containing region having a second opening, the second containing region connected with the movement region through the second opening;
    a third containing region having a third opening, the third containing region connected with the movement region through the third opening;
  a substrate;
  a housing disposed on the substrate, wherein the housing has a recess structure defining the movement region, the first containing region, the second containing region, and the third containing region;
  a light emitting device (LED) disposed in the first containing region, the LED suitable for providing a light beam;
  a first photosensitive device disposed in the second containing region and arranged on a side of the LED;
  a second photosensitive device opposing to the first photosensitive device and disposed in the third containing region and arranged on another side of the LED; and
  a reflective moving thin-element disposed in the movement region, wherein when the body tilts toward one of the different tilt directions, the reflective moving thin-element is correspondingly moved toward the tilt direction so that the reflective moving thin-element directly reflects the light beam provided from the LED to at least one of the first photosensitive device or the second photosensitive device, or the reflective moving thin-element shields the light beam provided from the LED from being transmitted to the first photosensitive device and the second photosensitive device.

2. The tilt sensor as claimed in claim 1, wherein a width of the first opening is larger than or equal to a size of the first containing region, a width of the second opening is larger than or equal to a size of the second containing region, and a width of the third opening is larger than or equal to a size of the third containing region.

3. The tilt sensor as claimed in claim 1, wherein a size of the reflective moving thin-element is larger than the width of the first opening, the width of the second opening, and the width of the third opening.

4. The tilt sensor as claimed in claim 1, wherein a shape of the reflective moving thin-element is a polygon.

5. The tilt sensor as claimed in claim 1, wherein a shape of the reflective moving thin-element is a rectangle.

6. The tilt sensor as claimed in claim 1, wherein the reflective moving thin-element is a light reflective thin-element suitable for reflecting the light beam of infrared wavelength.

7. The tilt sensor as claimed in claim 1, wherein a thickness of the reflective moving thin-element is substantially between 0.6 mm~0.1 mm.

8. The tilt sensor as claimed in claim 1, wherein the LED is a side-emitting type LED, and the light beam thereof is an infrared light.

9. The tilt sensor as claimed in claim 1, wherein the first photosensitive device and the second photosensitive device are respectively a photodiode or a phototransistor.

10. The tilt sensor as claimed in claim 1, wherein the LED, the first photosensitive device, and the second photosensitive device are die-bonded on a common plate.

11. The tilt sensor as claimed in claim 1, wherein the reflective moving thin-element has a first lateral surface and a second lateral surface, the first lateral surface and the second lateral surface respectively reflect the light beam provided by the LED to the first photosensitive device and the second photosensitive device when the body tiles toward a first tile direction.

12. The tilt sensor as claimed in claim 11, wherein the first lateral surface and the second lateral surface cannot respectively reflect the light beam provided by the LED to the first photosensitive device and the second photosensitive device when the body tiles toward a second tile direction inverse to the first tile direction.

13. The tilt sensor as claimed in claim 12, wherein only the first lateral surface reflect the light beam provided by the LED to the first photosensitive device when the body tiles toward a third tile direction perpendicular to the first tile direction.

14. The tilt sensor as claimed in claim 13, wherein only the second lateral surface reflect the light beam provided by the LED to the second photosensitive device when the body tiles toward a fourth tile direction inverse to the third tile direction.

* * * * *